United States Patent [19]
Morris

[11] 4,382,579
[45] May 10, 1983

[54] SAFETY LOCKING ARRANGEMENT

[75] Inventor: Lawrence J. Morris, Trentham, England

[73] Assignee: Corning Limited, Sunderland, England

[21] Appl. No.: 317,277

[22] Filed: Nov. 2, 1981

[30] Foreign Application Priority Data

Mar. 10, 1980 [GB] United Kingdom ............... 8007977

[51] Int. Cl.³ ............................................. F16K 31/44
[52] U.S. Cl. .................................... 251/214; 251/215; 251/288; 251/324
[58] Field of Search ............... 251/214, 215, 264, 265, 251/368, 335 R, 324, 273, 218, 288

[56] References Cited

U.S. PATENT DOCUMENTS

| 2,669,415 | 2/1954 | Gilroy | 251/215 |
| 2,998,733 | 9/1961 | Thompson | 251/553 |
| 3,589,677 | 6/1971 | Segers | 251/215 |
| 3,747,479 | 7/1973 | Nightingale et al. | 251/214 |
| 3,747,894 | 7/1973 | Pepper | 251/288 |
| 4,198,368 | 4/1980 | Nightingale | 251/214 |

FOREIGN PATENT DOCUMENTS

| 614172 | 2/1961 | Canada | 251/215 |
| 1157620 | 7/1969 | United Kingdom . | |

Primary Examiner—George L. Walton
Attorney, Agent, or Firm—Merchant, Gould, Smith, Edell, Welter & Schmidt

[57] ABSTRACT

A safety locking arrangement is provided on a valve for control of fluid flow comprising a valve body having a seat with a flow passage passing therethrough and a valve closure member located within the body. The valve closure member is adapted to engage the seat to effect closure of the valve. The valve closure member is carried by a cap adapted to enter into screw-threaded engagement with the valve body at the mouth thereof. To ensure retention of the cap on the body, the cap additionally enters into screw-threaded engagement with an annular retaining means disposed around and formed separately from the valve body, with the valve body itself being so formed in the mouth region that the retaining means cannot be withdrawn therefrom merely by rotation and/or displacement lengthwise of the valve body.

13 Claims, 4 Drawing Figures

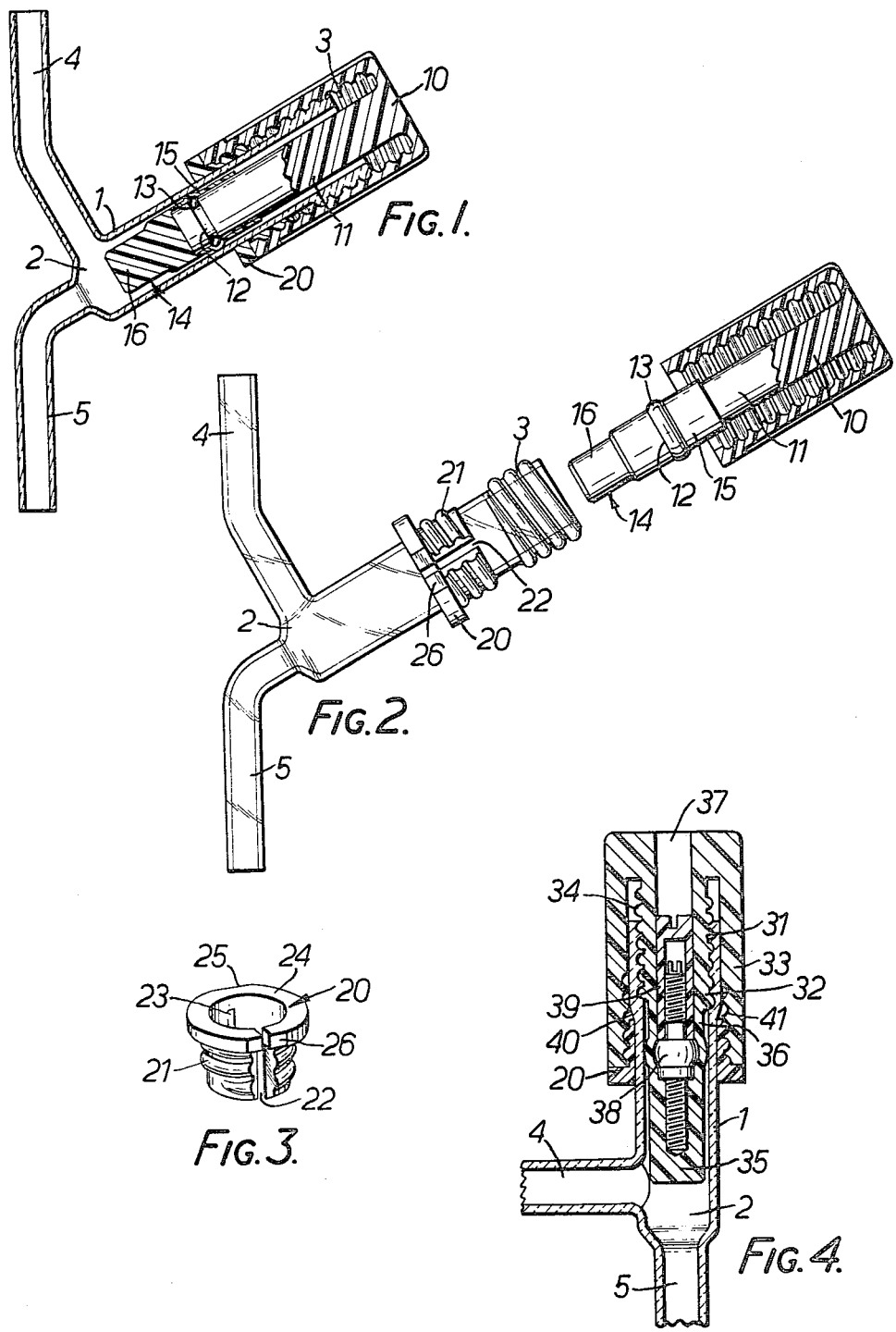

SAFETY LOCKING ARRANGEMENT

This invention relates to a valve for the control of fluid flow.

A common type of valve for the control of the fluid flow in a tubing or piping system comprises a valve body having a valve seat with a flow passage passing through the seat and a valve closure member located within the body. The valve closure member is adapted to engage the seat to effect closure of the valve. The valve closure member is carried by a rotatable member in screw-threaded engagement with the valve body at a mouth region thereof. Such a valve is operated simply by rotating the rotatable member towards the valve seat to effect closure of the valve to fluid flow and away from the valve seat to allow fluid flow to take place. Examples of valves of this type are described in British Patent Specifications Nos. 1,157,620 and 1,473,500.

The rotatable member is preferably a cap adapted to engage into a screw-threaded engagement with screw-threading on the exterior of the valve body. The cap is a member formed separately from the valve body and brought into engagement therewith when assembling equipment comprising the valve. It is frequently the case that corrosive or noxious fluids are being conveyed through a tubing or piping system comprising the valve and there exists the risk with valves of the aforesaid type that the cap or the rotatable closure member may be withdrawn from the valve seat to open the valve by rotation to an extent such that it is parted from the valve body. More particularly, if the cap or rotatable member is formed of plastics material, for example polypropylene, the deformability of this material is such that it may not be necessary to completely unscrew the cap of a rotatable member to achieve its separation from the valve body. When only one or two turns of the screw thread remain in use, it may well be that moderate traction on the cap or rotatable member will result in its separation from the valve body. However separation of the cap or rotatable member from the valve body results, there is the risk that a fluid, especially a corrosive or noxious fluid may be under such pressure as then to spurt from the opened valve body to release undesirable fumes into the atmosphere and/or harm an operator of the valve.

According to the present invention, there is provided a valve for the control of a fluid flow, comprising a valve body having a valve seat with a flow passage passing through the seat and a valve closure member located within the body, which valve closure member is adapted to engage the seat to effect closure of the valve, the valve closure member being carried by a cap adapted to enter into screw-threaded engagement with the valve body at a mouth region thereof, the cap additionally entering into screw-threaded engagement with an annular retaining means disposed around and formed separately from the valve body, the valve body being so formed in said mouth region that the retaining means is not able to be withdrawn therefrom only by rotation and/or displacement lengthwise of the valve body.

A valve may embody this invention whether the valve closure member engages with screw-threading formed internally or externally of the valve body in the mouth region thereof. It is merely necessary that the valve body be so formed in its mouth region that the retaining means is not able to be withdrawn therefrom only by rotation and/or displacement lengthwise of the valve body. When the valve body is formed externally with a screw-threading formed on the inner surface of the cap, then the screw-threading on the exterior surface of the valve body will meet this requirement. If the valve body is internally screw-threaded, then it will suffice for, for example, a lip to be formed around the mouth of the valve body.

The valve body of a valve according to the present invention will frequently be made of glass, especially borosilicate glass, and the cap will be formed of a thermoplastic plastics material, which should obviously not be one attacked by fluid passed through the tubing or piping system fitted with the valve. In many cases, it will be sufficient to form the cap of polypropylene. The annular retaining means may likewise be formed of plastics material, for example polypropylene, and is preferably constructed as a split-ring member so that it can be expanded for drawing over external screw-threading or other means for preventing its readily being withdrawn from the valve body, prior to emplacement on the valve body at a position where its screw thread may engage with screw-threading on the cap. Such a split-ring member may be particularly conveniently disposed around the valve body if, in addition to having a full longitudinal slit, it is additionally formed with one or more further slits extending along part of the length thereof. The split-ring member is additionally preferably formed with a circumferential flange at its forward end in the sense of its direction of fitting onto the valve body. This flange serves as a convenient abutment means for the cap to prevent the split-ring member from being completely drawn into the cap. The flange may be provided with one or more straight-edged peripheral regions to assist in handling of the split-ring member while rotating the cap to ensure that the desired engagement is achieved between the cap and the split-ring member when first fitting the cap on the valve or when desiring to completely remove the cap therefrom. At other times, the cap and split-ring member will remain in engagement with one another through their mutual screw-threading, thereby to ensure that during normal opening and closing of the valve, the cap member cannot be inadvertently completely detached from the valve body.

A valve embodying the invention is preferably of the type described in British Patent Specifications Nos. 1,157,620 and 1,473,500, the efficient seals of which are enhanced by the safety against loss of vacuum or corrosive or noxious fluids which may result from careless operation of the valve.

Thus one form of valve according to the invention includes a valve closure member comprising a deformable annular sealing portion and a means within the annular sealing portion for distending it radially outwardly to contact the walls of the valve body and thereby form a seal between the outer surface of the annular sealing portion and the surrounding valve body, the surface of the annular sealing portion being continuous with the rest of the surface of the valve closure member which is exposed to fluid or vacuum in a tubing or pipe system comprising the valve. The distending means preferably comprises an elastomeric material constrained between two surfaces whose distance apart may be varied, thereby applying an adjustable force on the elastomeric material giving it an adjustable radial distension. The distance between the two constraining surfaces may be determined by a screw which is extended sufficiently to allow adjustment while the sealing device is assembled within the valve body.

Alternatively, according to British Patent Specification No. 1,473,500, the valve closure member may comprise a mandrel having an end portion encircled by an annular groove of fixed dimensions, a resilient annulus located within the annular groove and a chemically inert sheath fitted closely over the surface of the end portion of the mandrel and overlying the resilient annulus. The sheath has a closed end adapted to engage the valve seat to effect closure of the valve and having overlying the resilient annulus an annular sealing portion standing proud of the surface of the rest of the sheath, the annular sealing portion being biassed against the surrounding valve body wall to form a sliding seal. The resilient annulus is preferably an O-ring having an external diameter greater than that of the mandrel so that in overlying the O-ring, an annular portion of the sheath is caused to stand proud of the surface of the rest of the sheath.

With both forms of valve, the annular sealing portion is preferably formed of fluorine-containing polymer, generally polytetrafluoroethylene.

For a better understanding of the invention and to show how the same may be carried into effect, reference will now be made by way of example only to the accompanying drawings wherein FIG. 1 is a section through a burette tap embodying the present invention in its assembled state;

FIG. 2 is a similar view to FIG. 1 but showing the cap of the burette tap before introduction into the tap;

FIG. 3 is a perspective view of the split-ring retaining member of the burette tap of FIGS. 1 and 2; and FIG. 4 is a longitudinal section through an alternative form of valve embodying this invention.

The valve shown in FIG. 1 has a glass body comprising a stem (1) having a smooth-surfaced bore with a valve seat (2) at one end. The other end of the stem is externally threaded at (3). Conduits (4) and (5) open into the bore of the stem, (1) via the valve seat. The valve is closed over by a cap (10), which comprises a mandrel (11) having a unitary end portion with a cylindrical surface in which is an annular groove (12). Within the groove is located a resilient annulus in the form of a rubber O-ring (13) whose outer peripheral part stands proud of the cylindrical surface of the mandrel. Enclosing the end of the mandrel is a close-fitting PTFE sheath (14) having thin side walls (15) and a more massive closed end (16) shaped to engage the valve seat (2).

Disposed around the stem (1) is a polypropylene split-ring retaining member (20), which can be seen from FIGS. 2 and 3 to be externally screw-threaded at (21). The split-ring member (20) has a slot (22) extending completely lengthwise thereof and a diametrically opposed slot (23) extending part of the length thereof. At one end, the split-ring retaining member (20) is formed with a flange (24) having oppositely disposed flat marginal regions (25) and (26).

In assembling the valve, it is first necessary to assemble its spindle and for this purpose the O-ring (13) is first slipped over the end of the mandrel until it is located in the annular groove. While holding the closed end of the sheath by hand, the side walls defining the open end of the sheath are pushed over the mandrel and O-ring until the mandrel is touching the closed end portion of the sheath, or nearly so. The split-ring retaining member is then opened out to allow it to be passed over the screw-threading (3) on the stem (1) and pulled thereover until below the screw-threading (3), when the slot (22) is allowed to close. The cap (10) is then brough to the valve and the spindle carried thereby is inserted into the bore of the stem so that the cap threads engage those of the body (2). As the cap is rotated, screw threads thereon eventually clear the external threading (3) and are then brought into engagement with the screw-threading (21) on the slip-ring retaining member, which is drawn up towards the cap (10) until the flange (24) abuts the bottom edge of the cap. The valve thus produced is now ready for incorporation into laboratory apparatus. The valve is then operable in known manner by rotation of the cap, which by its screw-threaded engagement of the valve body moves the spindle axially towards or away from the valve seat (2). The engagement of the cap with the split-ring retaining member (20), moreover, prevents the cap from being completely parted from the stem (1) while it remains in engagement with the retaining member (20). Should it be desired to remove the cap completely, then the flat marginal regions (25) and (26) assist in holding of the split-ring retaining member (20) while the cap is separated from it prior to its removal from the stem (1).

The spindle is constructed in accordance with U.K. Patent Specification No. 1,473,500 in that an annular portion of the side walls of the sheath is distended outwards by the O-ring and pressed against the internal surface of the bore of the stem, thereby providing a gland seal of the valve. When viewed from outside, that is through the glass valve body, the appearance of the seal is that of an annulus of about 1 mm in width whereby the glass looks as though it is wetted by the PTFE where this is pressed against it by the O-ring.

PTFE and other fluorine-containing polymers are the materials preferred for a pre-formed sheath of the aforesaid kind, because they are well-known for their chemical inertness and low coefficient of friction. Moreover, they possess physical properties which are very well suited to this application. PTFE, in particular, is sufficiently resilient to provide adequate closure of the valve seat and to follow minor variations in the bore wall when forming the annular gland seal.

The valve shown in FIGS. 1 and 2 is a simple valve suitable for controlling liquid flow through laboratory glassware, with the intention that it should be reasonably cheap to mass-produce commercially. Accordingly, a design requiring only a small quantity of the relatively expensive PTFE is provided and no provision is made for adjusting the outward distension in order to reduce the number of parts to be made and assembled. Hence, although the resilience of the O-ring allows a small amount of tolerance in the diameter of the bore of the stem, the size of the annular distended portion should be matched to the bore diameter. In practice, for controlling liquid flow at ambient pressures, for example in a burette, the provision of a valve constructed as aforesaid in a size matching the bore diameter of the stem is generally adequate and it is possible to obtain an extremely good seal, even with relatively high pressure differentials across the seal. However, where temperature cycling is required, especially with a high pressure differential across the gland seal, it is preferred to replace the spindle with a more sophisticated adjustably-distensible spindle, for example as described in British Patent Specification No. 1,157,620.

Thus, referring finally to FIG. 4 of the accompanying drawings, there is shown a valve body having a stem (1) whose bore is screw-threaded at (31) and with a valve seat (2) at one end. Conduits (4) and (5) open into the bore of the stem (1) via the valve seat. A valve spindle (32) is formed integrally with a cap region (33) as a closure member for the stem (1). The spindle is screw-threaded in an upper region (34) thereof to engage with the screw-threading of the bore of the stem (1). The valve spindle is hollow, being closed over at its bottom end (35) where it is of relatively high wall thickness. In an intermediate region (36) its wall thickness decreases, thereby making it more distendible. The central passage (37) within the spindle houses an expanding device constituted by a short length of rubber tubing (38) and a screwed sleeve (39) adjustment of which results in compression of the rubber tubing (38) thereby to cause it to bulge outwardly and thereby distend the fluorine-containing polymer (usually PTFE) of the spindle (32) against the confining wall of the stem (1). When the mandrel constituted by the portion of the screwed sleeve (39) below the rubber tubing (38) is screwed into the massive bottom end (35) of the spindle, the screwed sleeve is free to move along the mandrel to effect the compression of the rubber and the resulting axial stresses are confined to the expanding device and do not affect the spindle.

To prevent the spindle from being inadvertently completely withdrawn from the stem (1), a split-ring retaining member (20) of the type shown in FIG. 3 is disposed around the stem (1) at a position below a shoulder (40) resulting from the thickening of the stem required for provision of the internal screw-threading (31) therein. The provision of slots in the split-ring retaining member (20) is such as to allow expansion of the split-ring retaining member, the opening out of the slot (22) enabling it to be passed over this thickened part of the stem (1). The cap region (33) is formed with screw threads (41), which enable the cap to be brought into engagement with the retaining member (20), thereby to ensure that the cap remains captive on the stem during normal operation of the valve.

I claim:

1. A valve for the control of fluid flow, comprising a valve body having a valve seat with a flow passage passing through the seat and a valve closure member located within the body, which valve closure member is adapted to engage the seat to effect closure of the valve, the valve closure member being carried by a cap adapted to enter into screw-threaded engagement with the valve body at a mouth region thereof, wherein the cap enters into screw-threaded engagement with an annular retaining means disposed externally around and formed separately from the valve body, said retaining means being captured by said cap and caused to move with said cap axially along said valve body in response to movement of said cap, and the valve body is so formed in said mouth region that the retaining means and cap means is not able to withdrawn therefrom by just rotation or displacement lengthwise of the valve body when the valve closure member is in its fully open position.

2. A valve according to claim 1, in which the annular retaining means (20) is an externally threaded split ring member formed with a longitudinal slit (22) extending therethrough along the entire length thereof.

3. A valve according to claim 2, wherein the split ring member is formed with one or more further longitudinal slits (23) extending therethrough along part of the length thereof.

4. A valve according to claim 2 or 3, wherein said annular retaining means is additionally formed with a circumferential flange (24) at its forward end in the sense of its direction of fitting onto the valve body.

5. A valve according to claims 1 or 2 wherein the cap (10) comprised by the valve closure member engages with screw threading (3) formed externally of the valve body in the mouth region thereof and wherein said annular retaining means has a rearward edge opposite said forward end and wherein said rearward edge engages said external threading on said valve body when said valve closure member is at its most extended position.

6. A valve according to claim 1, wherein the valve closure member engages with screw threading (31) formed internally of the valve body in the mouth region thereof and a shoulder (40) is formed externally of the valve body in the mouth region thereof and wherein said annular retaining means engages said shoulder when said valve closure means is in its most extended position thereby preventing said valve closure means from being removed.

7. A valve according to claim 1 or 2, wherein the valve member comprises a deformable annular sealing member (38) and a means (39) within the annular sealing portion for distending it radially outwardly to contact the walls of the valve body and thereby form a seal between the outer surface and of the annular sealing portion and the surrounding valve body, the surface of the annular sealing portion being continuous with the rest of the surface of the valve closure member which is exposed to fluid or vacuum in a tubing or pipe system comprising the valve.

8. A valve according to claim 7, in which the distending means comprises an elastomeric material constrained between two surfaces whose distance apart may be varied, thereby applying an adjustable force on the elastomeric material giving it an adjustable radial distension.

9. A valve according to claim 8, wherein the distance between the two constraining surfaces is determined by a screw (39) which is extended sufficiently to allow adjustment while the sealing device is assembled within the valve body.

10. A valve according to claim 7, wherein the annular sealing portion is formed of fluorine-containing polymer.

11. A valve according to claim 1 or 2, wherein the valve closure member comprises a mandrel (11) having an end portion encircled by an annular groove (12) of fixed dimensions, a resilient annulus (13) located within the annular groove and a chemically inert sheath (14) fitted closely over the surface of the end portion of the mandrel and overlying the resilient annulus, the sheath having a closed end (16) adapted to engage the valve seat to effect closure of the valve and having, overlying the resilient annulus, an annular sealing portion (15) standing proud of the surface of the rest of the sheath, the annular sealing portion being biassed against the surrounding valve body wall to form a sliding seal.

12. A valve according to claim 11, in which the resilient annulus is an O-ring having an external diameter greater than that of the mandrel so that in overlying the O-ring, an annular portion of the sheath is caused to stand proud of the surface of the rest of the sheath.

13. A valve according to claim 11 wherein the annular sealing portion is formed of fluorine-containing polymer.

* * * * *